United States Patent
Kelly (10) Patent No.: US 10,155,516 B2
(45) Date of Patent: Dec. 18, 2018

(54) VEHICLE SPEED CONTROL SYSTEM AND METHOD

(71) Applicant: Jaguar Land Rover Limited, Whitley Coventry Warwickshire (GB)

(72) Inventor: James Kelly, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 121 days.

(21) Appl. No.: 14/910,690

(22) PCT Filed: Jul. 15, 2014

(86) PCT No.: PCT/EP2014/065115
§ 371 (c)(1),
(2) Date: Feb. 6, 2016

(87) PCT Pub. No.: WO2015/018611
PCT Pub. Date: Feb. 12, 2015

(65) Prior Publication Data
US 2016/0185350 A1 Jun. 30, 2016

(30) Foreign Application Priority Data

Aug. 7, 2013 (GB) .................................. 1314154.4

(51) Int. Cl.
*B60W 10/18* (2012.01)
*B60W 10/184* (2012.01)
(Continued)

(52) U.S. Cl.
CPC ............ *B60W 30/18* (2013.01); *B60W 10/04* (2013.01); *B60W 10/06* (2013.01);
(Continued)

(58) Field of Classification Search
CPC ........... B60W 30/18; B60W 30/18063; B60W 30/18172; B60W 10/04; B60W 10/08; B60W 10/18; B60W 10/184
See application file for complete search history.

(56) References Cited

U.S. PATENT DOCUMENTS

2004/0215385 A1* 10/2004 Aizawa .................. B60K 31/00
701/93
2007/0061059 A1* 3/2007 Inoue .................... B60W 10/06
701/41
(Continued)

FOREIGN PATENT DOCUMENTS

| DE | 102007042128 A1 | 3/2009 |
| DE | 102012200303 A1 | 7/2013 |

(Continued)

OTHER PUBLICATIONS

Combined Search and Examination Report corresponding to application No. GB1314154.4, dated Feb. 17, 2014, 8 pages.
(Continued)

*Primary Examiner* — Adam D Tissot
(74) *Attorney, Agent, or Firm* — Reising Ethington P.C.

(57) ABSTRACT

Embodiments of the present invention provide a vehicle speed control system operable to cause a vehicle to operate in accordance with a target speed value by controlling an amount of brake torque applied by a braking system and an amount of drive torque applied by a powertrain to one or more wheels of the vehicle, the system being operable to detect a leading wheel step event in which a leading wheel encounters an abrupt increase in surface gradient, the system being operable in dependence on the detection of a leading wheel step event to cause brake torque to be applied against drive torque in anticipation of a trailing wheel step event corresponding to the leading wheel step event, the system being operable to cause the application of brake torque at
(Continued)

least until a trailing wheel has travelled a sufficient distance to reach the location at which a leading wheel experienced the leading wheel step event.

21 Claims, 7 Drawing Sheets

(51) Int. Cl.
  *B60W 10/188* (2012.01)
  *B60W 10/192* (2012.01)
  *B60W 30/18* (2012.01)
  *B60W 10/06* (2006.01)
  *B60W 10/04* (2006.01)

(52) U.S. Cl.
  CPC .... *B60W 10/184* (2013.01); *B60W 30/18063* (2013.01); *B60W 30/18172* (2013.01); *B60W 2520/00* (2013.01); *B60W 2520/105* (2013.01); *B60W 2520/26* (2013.01); *B60W 2550/14* (2013.01); *B60W 2550/147* (2013.01); *B60W 2710/0666* (2013.01); *B60W 2710/182* (2013.01); *B60W 2720/10* (2013.01)

(56) References Cited

U.S. PATENT DOCUMENTS

| | | |
|---|---|---|
| 2008/0015743 A1 | 1/2008 | Haug |
| 2010/0114445 A1 | 5/2010 | Groult |
| 2011/0066342 A1 | 3/2011 | Ozaki |
| 2012/0226399 A1 | 9/2012 | Bergfjord |
| 2014/0229049 A1 | 8/2014 | Horst et al. |
| 2015/0203117 A1 | 7/2015 | Kelly et al. |
| 2015/0217767 A1 | 8/2015 | Kelly et al. |
| 2015/0232093 A1 | 8/2015 | Fairgrieve et al. |

FOREIGN PATENT DOCUMENTS

| | | |
|---|---|---|
| EP | 1873736 A1 | 1/2008 |
| EP | 1923289 A2 | 5/2008 |
| GB | 2357159 A | 6/2001 |
| GB | 2508461 A | 6/2014 |
| WO | WO2011040870 A1 | 4/2011 |
| WO | WO2013029823 A1 | 3/2013 |
| WO | WO2014027098 A1 | 2/2014 |
| WO | WO2014027111 A1 | 2/2014 |
| WO | WO2014056653 A1 | 4/2014 |

OTHER PUBLICATIONS

Further Search Report corresponding to application No. GB1314154.4, dated Aug. 27, 2014, 3 pages.
International Search Report corresponding to International application No. PCT/EP2014/065115, dated Sep. 30, 2014, 6 pages.
Written Opinion corresponding to International application No. PCT/EP2014/065115, dated Sep. 30, 2014, 8 pages.

* cited by examiner

VEHICLE SPEED CONTROL SYSTEM AND METHOD

FIELD OF THE INVENTION

This disclosure relates to a system for controlling the speed of a vehicle. In particular, but not exclusively, the disclosure relates to a system for controlling the speed of a land-based vehicle which is capable of driving in a variety of different and extreme terrains and conditions. Aspects of the invention relate to a system, to a method and to a vehicle.

The content of co-pending UK patent application no GB81214651.0 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, and the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

SUMMARY OF THE INVENTION

Embodiments of the invention may be understood with reference to the appended claims.

Aspects of the present invention provide a system, a vehicle and a method.

In an aspect of the invention for which protection is sought there is provided a vehicle speed control system operable to cause a vehicle to operate in accordance with a target speed value by controlling an amount of brake torque applied by a braking system and an amount of drive torque applied by a powertrain to one or more wheels of the vehicle, the system being operable to detect a leading wheel step event in which a leading wheel encounters an obstacle presenting an abrupt increase in surface gradient, the system being operable in dependence on the detection of a leading wheel step event to cause brake torque to be applied against drive torque in anticipation of a corresponding trailing wheel step event, the system being operable to cause the application of brake torque at least until a trailing wheel has travelled a sufficient distance to reach the location at which a leading wheel experienced the leading wheel step event.

It is to be understood that the corresponding trailing wheel step event may include an event in which a trailing wheel encounters the same or a corresponding obstacle to that first encountered by the leading wheel.

The corresponding obstacle may be the same obstacle, especially if the vehicle is travelling in a straight line. The system may be operable to predict when the trailing wheel will encounter the obstacle (which may also be referred to herein as an object) at least in part in dependence on steering angle since a curvature of a path of the vehicle may influence when the vehicle encounters the obstacle.

Embodiments of the present invention have the advantage that a risk of rollback or bounce-back of the vehicle when one or more trailing wheels encounter a step in a driving surface may be reduced.

It is to be understood that if substantially no brake torque is being applied when the leading wheel step event is detected the amount of brake torque may be increased from substantially zero by the control system.

It is to be understood that brake torque requested by the vehicle speed control system may be applied against drive torque to reduce the risk of bounce-back substantially immediately upon detection of the leading wheel step event. Alternatively brake torque may be applied against drive torque to reduce the risk of bounce-back immediately prior to a trailing wheel reaching the location at which the leading wheel experienced the leading wheel step event.

In some embodiments brake torque may be biased selectively to leading wheels of the vehicle in response to detection of a leading wheel step event such that an amount of brake torque applied to the leading wheels is greater than that applied to the trailing wheels. In some embodiments brake torque may be applied substantially only to the leading wheels.

In some alternative embodiments, brake torque is applied selectively to trailing wheels of the vehicle in response to detection of a leading wheel step event such that an amount of brake torque applied to the trailing wheels is greater than that applied to the leading wheels. In some embodiments brake torque may be applied substantially only to the trailing wheels.

The system may be operable to increase the amount of drive torque applied to the one or more wheels to compensate at least in part for the increase in brake torque applied in response to detection of the leading wheel step event.

The system may be operable to detect a trailing wheel slip event.

It is to be understood that a trailing wheel slip event may include an event in which a trailing wheel encounters an abrupt increase in surface gradient.

The system may be operable to decrease the amount of brake torque applied against drive torque once a trailing wheel slip event has been detected.

The system may then continue to operate in accordance with a methodology for negotiating a surface step. However, importantly, the control system anticipates the occurrence of a trailing wheel step event when a leading wheel step event is detected and employs the braking system to act against the powertrain to resist 'bounce back' of the vehicle when the surface step is encountered by a trailing wheel.

It is to be understood that in some embodiments the control system may maintain at least some brake torque applied to one or more wheels against drive torque when the trailing wheel slip event is detected so as to reduce lurch of the vehicle when the obstacle triggering the trailing wheel step event has been mounted. It is to be understood that an amount of lurch, if any, of the vehicle as the vehicle crests the obstacle may be more readily managed in the presence of a least some brake torque acting against powertrain torque as the vehicle crests the obstacle. This may be particularly useful in vehicles having motors such as internal combustion engines for which there is a time delay in response of the motor to a change in torque demand due at least in part to inertia of the motor.

The system may be operable to limit a speed of the vehicle to a prescribed surface step speed limit value after a leading wheel surface step is detected and before a trailing wheel reaches the location at which the leading wheel step event was detected, the system being operable to lift the limit on speed when the trailing wheel has passed the location at which the leading wheel step event was detected.

The surface step speed limit value may be determined at least in part in dependence on one or more characteristics of terrain over which the vehicle is travelling.

The one or more characteristics may be determined at least in part by reference to a currently selected driving mode of the vehicle.

The control system may comprise a plurality of subsystem controllers each operable in a plurality of subsystem function modes, the system being operable to cause the vehicle to operate in one a of plurality of driving modes, wherein in each mode each of the sub-systems is set to the function mode most appropriate to those conditions.

The system may be operable to detect the leading wheel step event at least in part in dependence on detection of an abrupt increase in rate of deceleration of the vehicle consistent with a leading wheel step event.

The system may be operable to detect the leading wheel step event at least in part in dependence on detection that a rate of deceleration of the vehicle consistent with a leading wheel step event exceeds a prescribed value over a prescribed period.

It is to be understood that the system may be configured to distinguish between deceleration of the vehicle due to braking, and deceleration due to a surface step event.

Thus in some embodiments if a rate of deceleration of the vehicle exceeds a prescribed value over a prescribed period of time and the rate is not attributable to application of brake torque to slow the vehicle, the system may determine that a leading wheel step event has occurred. The system may in addition or instead monitor suspension articulation and/or vehicle pitch angle or pitch rate in order to verify that an increase in deceleration is consistent with a leading wheel encountering a step and not a trailing wheel encountering a step. Other arrangements are also useful.

One or both of the prescribed value of rate of deceleration and prescribed period may be substantially fixed values regardless of vehicle speed. One or both the prescribed values may be a function of speed or any other suitable parameter. Other arrangements are also useful.

In a further aspect of the invention for which protection is sought there is provided a vehicle comprising a system according to a preceding aspect.

The vehicle may have four wheels, the vehicle being operable in a four wheel drive mode in which each of the four wheels are driven by a powertrain of the vehicle.

The vehicle may be further operable in a two wheel drive mode in which only two wheels of the vehicle are driven by the powertrain.

In one aspect of the invention for which protection is sought there is provided a method of controlling a vehicle comprising:

causing the vehicle to operate in accordance with a target speed value by controlling an amount of brake torque applied by a braking system and an amount of drive torque applied by a powertrain to one or more wheels of the vehicle;

detecting a leading wheel step event in which a leading wheel encounters an obstacle presenting an abrupt increase in surface gradient; and causing brake torque to be applied against drive torque in dependence on detection of a leading wheel step event in anticipation of a corresponding trailing wheel step event, the method comprising causing the application of brake torque at least until a trailing wheel has travelled a sufficient distance to reach the location at which a leading wheel experienced the leading wheel step event.

It is to be understood that the corresponding trailing wheel slip event may include an event in which a trailing wheel encounters the same or a corresponding obstacle.

In a further aspect of the invention for which protection is sought there is provided a vehicle speed control system operable to cause a vehicle to operate in accordance with a target speed value by controlling an amount of brake torque applied by a braking system and an amount of drive torque applied by a powertrain to one or more wheels of the vehicle, the system being operable to detect a leading wheel step event in which a leading wheel encounters an obstacle presenting an abrupt increase in surface gradient, the system being operable in dependence on the detection of a leading wheel step event to limit a speed of the vehicle to a prescribed surface step speed limit value after a leading wheel surface step is detected and before a trailing wheel reaches the location at which the leading wheel step event was detected, the system being operable to lift the limit on speed when the trailing wheel has passed the location at which the leading wheel step event was detected.

Optionally, the surface step speed limit value is determined at least in part in dependence on one or more characteristics of terrain over which the vehicle is travelling.

Optionally the one or more characteristics are determined at least in part by reference to a currently selected driving mode of the vehicle.

In one aspect of the invention for which protection is sought there is provided a method of controlling a vehicle comprising:
causing the vehicle to operate in accordance with a target speed value by controlling an amount of brake torque applied by a braking system and an amount of drive torque applied by a powertrain to one or more wheels of the vehicle;
detecting a leading wheel step event in which a leading wheel encounters an obstacle presenting an abrupt increase in surface gradient; and
causing a speed of the vehicle to be limited to a prescribed surface step speed limit value after a leading wheel surface step is detected and before a trailing wheel reaches the location at which the leading wheel step event was detected, the method comprising lifting the limit on speed when the trailing wheel has passed the location at which the leading wheel step event was detected.

In an aspect of the invention for which protection is sought there is provided a vehicle speed control system operable to cause a vehicle to operate in accordance with a target speed value by controlling an amount of brake torque applied by a braking system and an amount of drive torque applied by a powertrain to one or more wheels of the vehicle, the system being operable to detect a surface step event in which a leading wheel encounters an obstacle presenting an abrupt increase in surface gradient, the system being operable in dependence on the detection of the surface step event to cause brake torque to be applied against drive torque in anticipation of a step event being encountered by a trailing wheel corresponding to the obstacle first encountered by the leading wheel, the system being operable to cause the application of brake torque at least until a trailing wheel has travelled a sufficient distance to reach the location at which the leading wheel experienced the surface step event.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the invention will now be described, by way of example only, with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
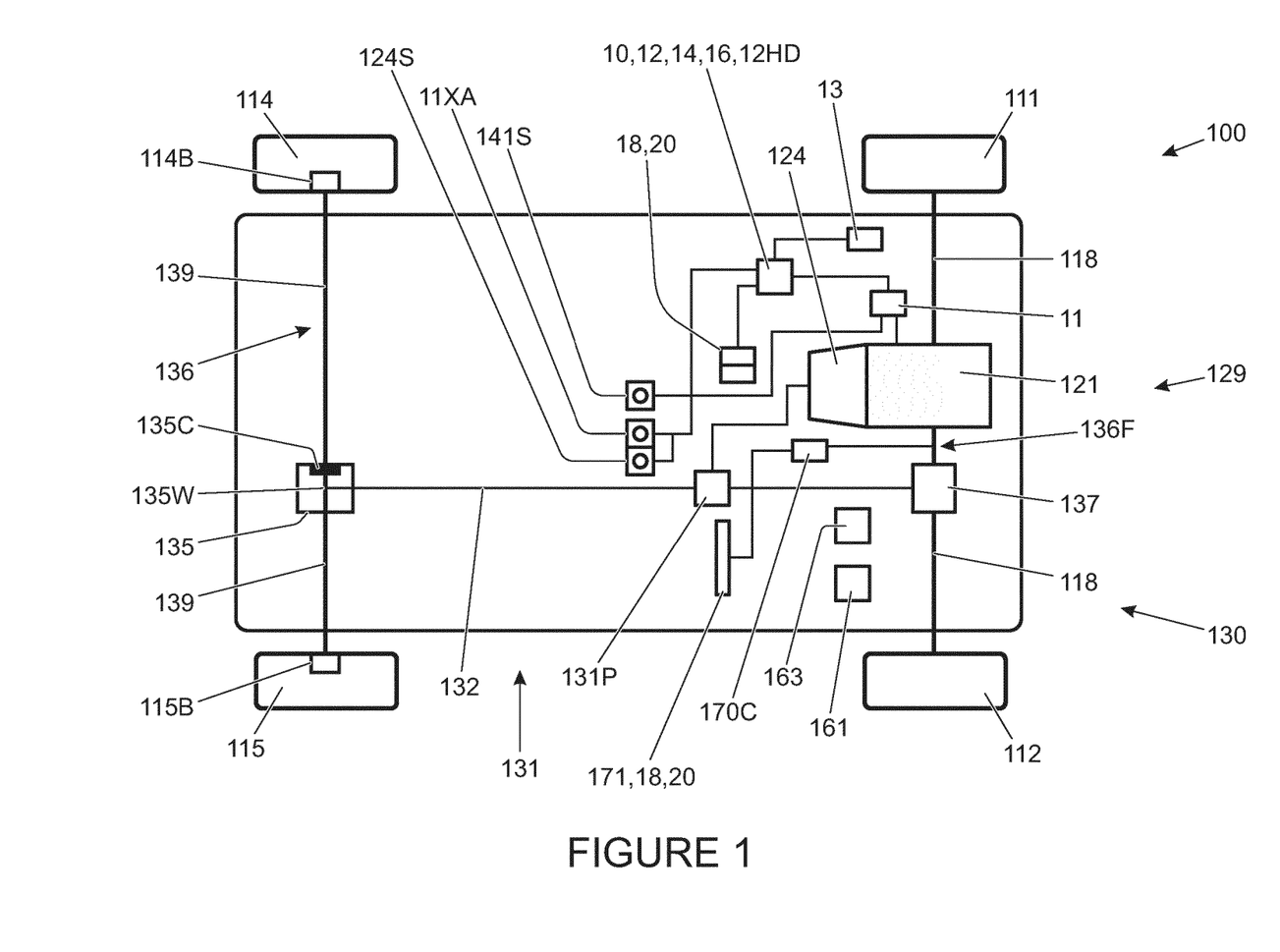
FIG. 1 is a schematic illustration of a vehicle according to an embodiment of the invention in plan view.
Figure 2:
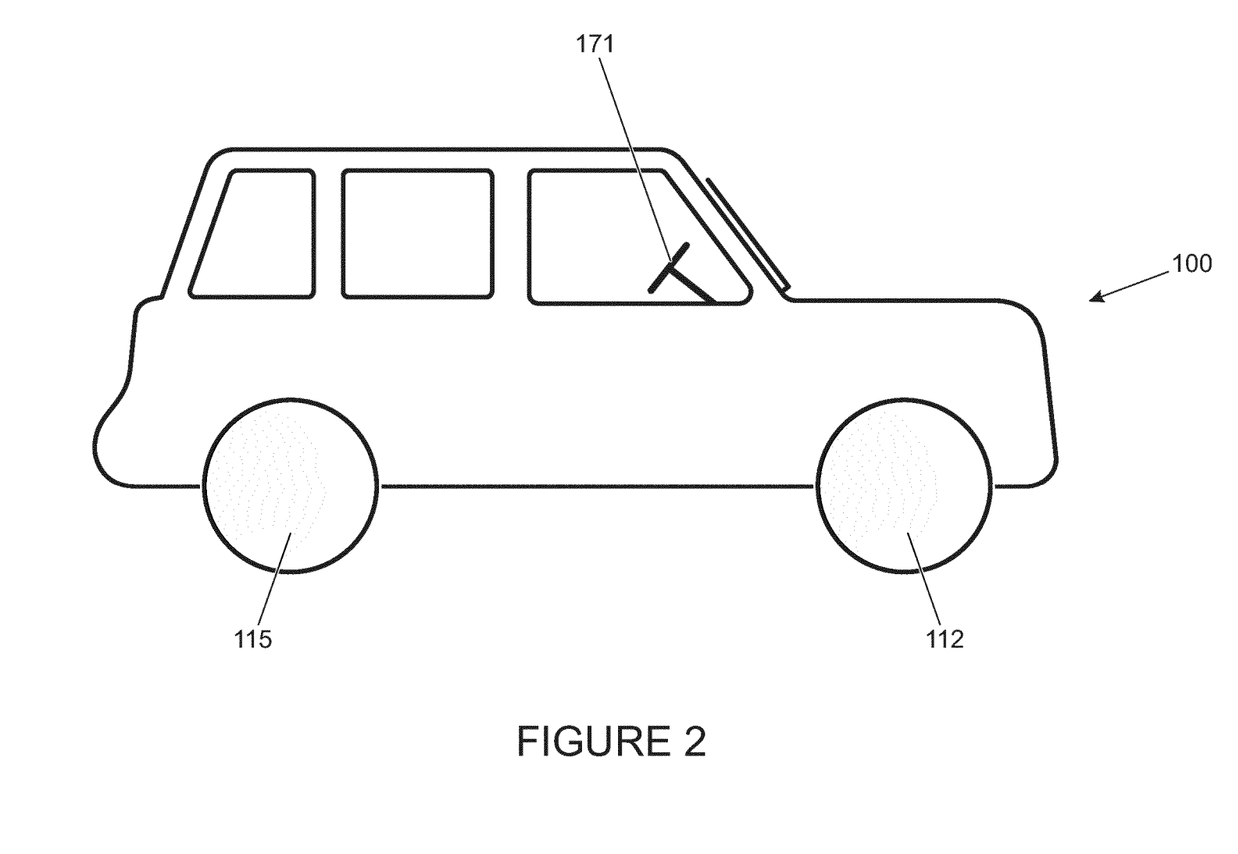
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/our wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
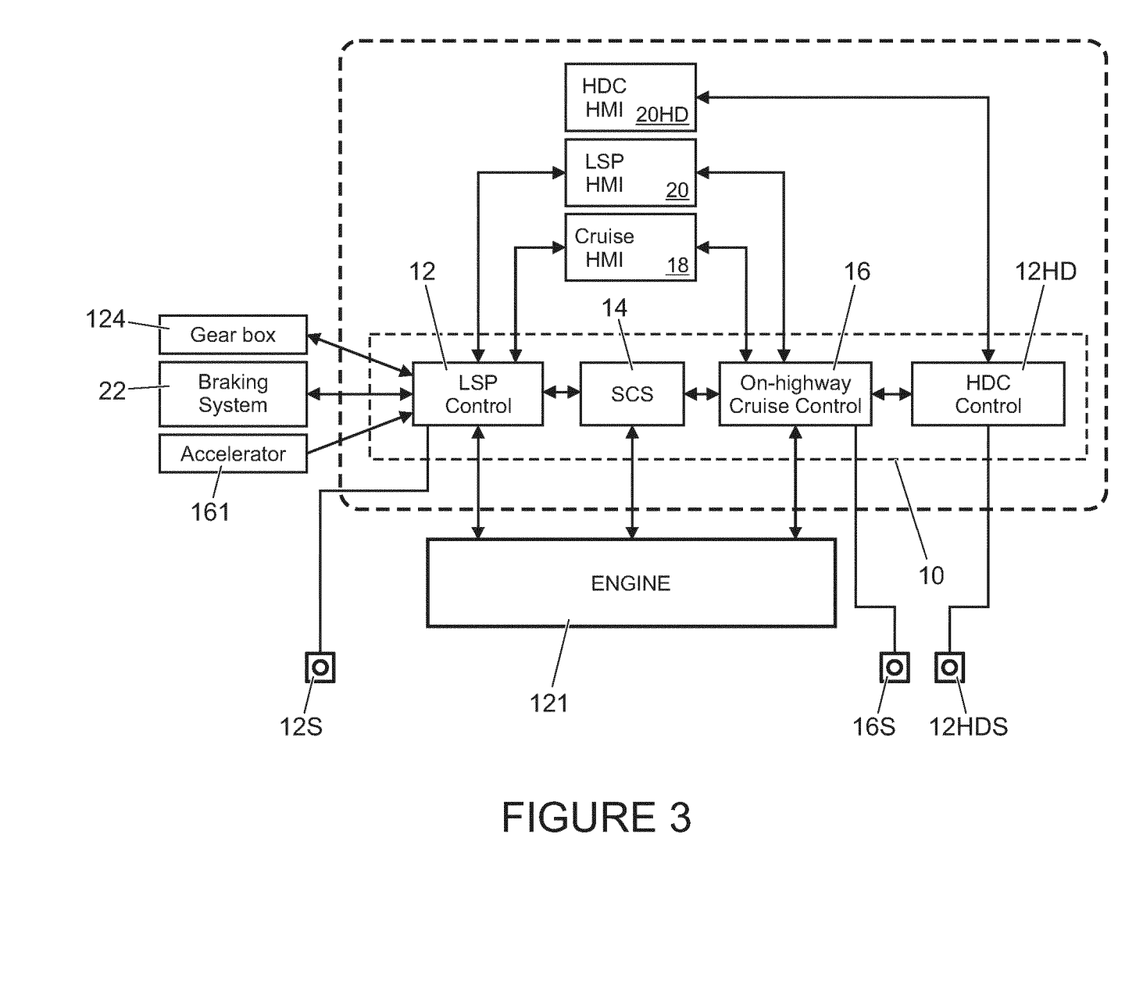
FIG. 3 is a high level schematic diagram of a vehicle speed control system of an embodiment of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
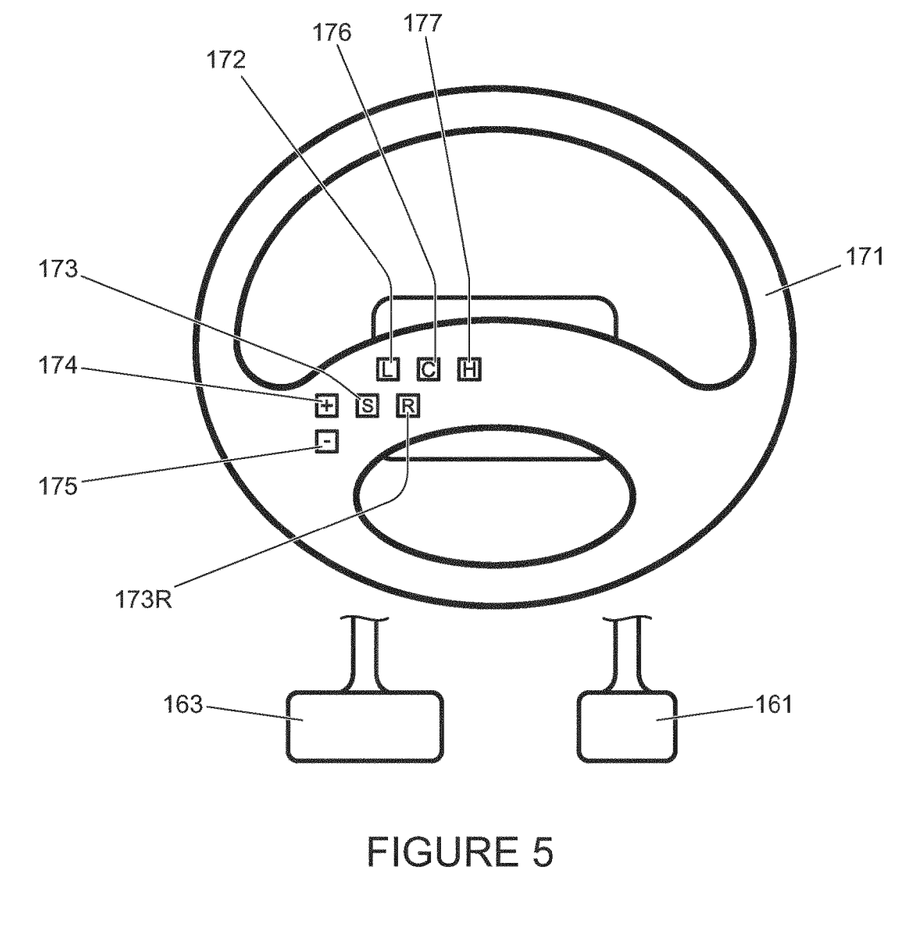
FIG. 5 illustrates a steering wheel and brake and accelerator pedals of a vehicle according to an embodiment of the present invention.

As noted above, the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses a brake pedal 163 or, in the case of vehicles with a manual transmission, a clutch pedal (not shown), the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and a hill descent control (HDC) control system 12HD.

Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of the HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HOC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HOC set-speed parameter HDC_set-speed and to adjust the value of HDC_set-speed using the same controls as the cruise control system 16 and LSP control system 12. Thus, in the present embodiment, when the HOC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored due to the vehicle speed being above the limit for operation of the system HDC 12HD.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP_set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
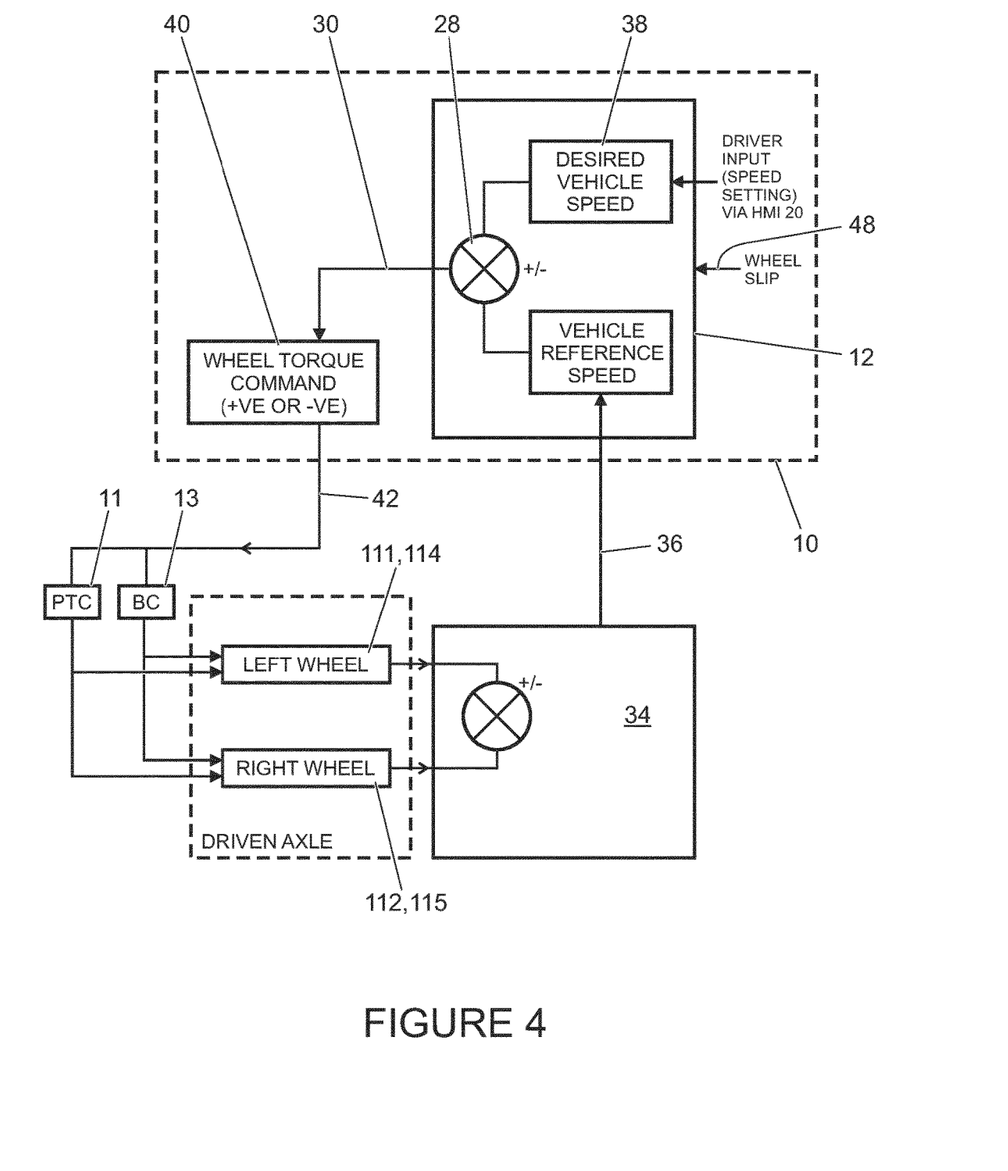
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines. The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48 whilst the LSP control system 12 is active, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16. In some arrangements the SCS 14 provides the wheel slip event signal 48 to the LSP control system 12 or cruise control system 16 depending on which system is operating at the time. In some arrangements the SCS 14 broadcasts the signal 48 on a controller area network (CAN) bus (not shown) with which the LSP control system 12 and cruise control system 16 are in communication, whereby the systems 12, 16 may detect the signal 48, A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

A-569 Anti-Rollback

When the LSP control system 12 is controlling vehicle speed, the system 12 is configured to monitor a rate of acceleration of the vehicle by reference to a signal indicative thereof. The signal may be produced by one or more accelerometers or other suitable sensing means mounted to the vehicle and arranged to measure vehicle acceleration in line with the longitudinal and/or vertical axis of the vehicle. If the rate of longitudinal acceleration indicates that the vehicle 100 is accelerating or decelerating at a rate consistent with the encountering of an obstacle presenting an abrupt increase in surface gradient such as a step, a pothole, or any other feature, the system 12 is configured to set a flag indicative of the detection of a leading wheel step event. The control system 12 then monitors vehicle progress from the location at which the leading wheel step event is detected.

When the vehicle 100 has travelled a prescribed distance after detection of the leading wheel step event, the system 12 commands application of a braking system 22 to oppose vehicle progress by commanding an increase in brake pressure and therefore brake torque of braking system 22. Brake pressure is commanded to increase to a prescribed trailing wheel step event amount. Substantially simultaneously, the system 12 commands an increase in drive torque developed by the powertrain 129 to compensate for the increase in brake torque. The amount of powertrain torque is increased to compensate for the increase in brake torque such that vehicle speed is substantially unchanged, and any fluctuation or variation of the vehicle speed during the negotiation of the obstacle is controlled. In this way, vehicle ride quality and composure is enhanced when driving off-road, whilst the vehicle speed corresponds to the prevailing target speed value LSP_set-speed, maintained by the system 12, reducing driver workload. In the present embodiment the prescribed distance corresponds to substantially half the distance between leading and trailing wheels of the vehicle 100, i.e. substantially 50% of the wheelbase length value of the vehicle 100. Other distances are useful.

In the present embodiment, the control system 12 is configured to ensure that the amount of brake torque applied by the braking system 22 when one or both trailing wheels reach the location at which the leading wheel step event occurred s at least equal to the prescribed trailing wheel step event amount. If the LSP control system 12 has already commanded application of brake torque by the braking system 22 for another reason, for example in response to the detection of a wheel slip event, the system 12 does not command a further increase in brake torque (or brake pressure) or an increase in powertrain torque unless the amount of brake torque (or brake pressure) is less than the prescribed trailing wheel step event amount. If the amount of brake torque (or pressure) is less than the prescribed trailing wheel step event amount, the control system 12 commands an increase in brake torque or brake pressure, and a corresponding increase in powertrain torque, such that the amount of brake torque or brake pressure is substantially equal to the prescribed trailing wheel step event amount. Thus, the prescribed trailing wheel step event amount may be considered to represent a minimum amount of brake torque or brake pressure for which the trailing wheel is permitted to negotiate the terrain feature. Other arrangements are also useful.

In some alternative embodiments the LSP control system 12 may be configured to increase the amount of brake torque (or brake pressure) applied by the braking system 22 in anticipation of a trailing wheel step event regardless of the prevailing amount of brake torque or brake pressure already applied by the braking system 22, optionally subject to a prescribed ceiling amount of brake torque or pressure.

The LSP control system 12 ensures that the value of brake torque or brake pressure is at least equal to the prescribed trailing wheel step event amount and the vehicle is driven by the powertrain 129 against the brake torque developed by the braking system 22. The control system 12 causes the vehicle 100 to be driven a sufficient distance to ensure that a trailing wheel of the vehicle 100 has reached the location at which the leading wheel experienced the leading wheel step event and began to negotiate the obstacle and the attendant increase in gradient. The system 12 may then reduce the amount of additional brake torque and the amount of additional powertrain torque (if any) that has been applied to resist roll-back. In some embodiments, at least a certain amount of brake pressure may continue to be applied against powertrain drive torque as the obstacle is negotiated in order to prevent excessive acceleration of the vehicle 100 once the trailing wheel begins to crest the obstacle. By cresting is meant that a pitch angle of the vehicle begins to decrease, i.e. a leading portion of the vehicle begins to pitch in a downward direction, as the gradient of the obstacle begins to decrease as the trailing wheel approaches completion of negotiation of the gradient encountered. Cresting may be detected in some embodiments by monitoring one or more vehicle parameters such as vehicle pitch or pitch rate, vehicle acceleration and/or powertrain torque demand. Cresting may be detected in some embodiments by monitoring powertrain torque demand and detecting an increase in vehicle speed and a corresponding decrease in powertrain torque as the vehicle crests an obstacle. In some embodiments, detection of cresting may be made by means of a combination of powertrain torque demand, vehicle acceleration and changes in pitch angle. Other arrangements are also useful.

In an example, a vehicle is traveling off-road on substantially flat terrain and one of the leading wheels of the vehicle encounters an obstacle, such as an isolated boulder, with an upper surface above the surface of the substantially flat surrounding terrain. The negotiation of the obstacle by the vehicle wheel gives rise to a step-event detectable by the system 12. When the leading wheel of the vehicle climbs up the obstacle, the vehicle body will pitch upwards, adopting a 'nose-up' attitude, but will reach a maximum pitch angle (nose-up) just before the leading wheel passes over an uppermost portion of the boulder. The vehicle attitude will return towards a being substantially horizontal once the leading wheel clears the boulder. However, if the vehicle proceeds along a path so as to cause a trailing wheel to encounter the same obstacle, the vehicle will pitch downwards adopting a 'nose-down' attitude as the trailing wheel climbs the boulder. The vehicle will reach a maximum pitch angle (nose-down) just before the trailing wheel clears the uppermost portion of the boulder. The vehicle attitude will return to being substantially horizontal once the trailing wheel clears the boulder.

Once the leading wheel clears the obstacle, the detected step event is complete, but the system 12 will maintain brake application to one or more vehicle wheels so as to mitigate the severity of the contact between the trailing wheel and obstacle, which can give rise to an uncomfortable bounce-back or rebound of the wheel (and vehicle) off the obstacle, reducing vehicle momentum and degrading vehicle composure. In a typical off-road vehicle, if the step event occurs whilst ascending a steep slope, the rebound may cause the vehicle to temporarily move backwards down the slope until the driver increases positive torque applied to the wheels, whereas with a vehicle having a system 12 according to an embodiment of the present invention, the intervention of the system 12 mitigates this effect and greatly enhances off-road capability by maintaining momentum.

It will be appreciated from the example given above, that as the vehicle wheels encounter an obstacle during a step event, composed progress will be at least temporarily disturbed as the wheel transitions from rolling on a flat surface to climbing the obstacle. This transition results in a variation in vehicle acceleration, in particular parallel to the longitudinal and vertical axes, and variation in vehicle attitude. It is to be understood that the system 12 monitors and reacts to these variations.

As noted above the terrain presenting the abrupt increase in gradient may be a step, a pothole or other terrain feature.

It is to be understood that the control system 12 may perform additional control of brake torque applied by the braking system 22 and powertrain torque applied by the powertrain 129 in order to reduce rapid increases in acceleration of the vehicle as a vehicle negotiates a step, for example when a leading and/or trailing wheel crests a step or other abrupt terrain feature. Importantly, the system 12 causes an increase in brake torque prior to a trailing wheel encountering a surface step event corresponding to a surface step that has already been experienced by a leading wheel.

Embodiments of the present invention have the advantage that a control system may reduce a risk of roll-back of a vehicle 100 when one or both trailing wheels thereof encounter a surface step or other abrupt terrain feature. The LSP control system 12 employs intelligence gained in respect of terrain encountered by one or both leading wheels of the vehicle 100 to manage the negotiation of terrain by one or both trailing wheels, reducing or eliminating roll-back of the vehicle 100 due to trailing wheel step events. Embodiments of the invention enable an increase in vehicle composure to be achieved, resulting in enhancement of occupant enjoyment and a reduction in occupant fatigue.

In some embodiments the control system 12 may be configured to impose a ceiling on allowable vehicle speed to a prescribed maximum trailing wheel step event speed value when a leading wheel step event is detected. Thus, if the instant vehicle speed exceeds this value the speed is reduced such that the speed is less than or substantially equal to this value. This feature has the advantage of reducing a speed at which the trailing wheel impacts the obstacle, further reducing an amount of any rollback or bounce-back of the vehicle 100.

An improvement in vehicle composure may therefore be enjoyed when the one or more trailing wheels experience the trailing wheel step event. It is to be understood that if, in contrast, a user were controlling vehicle speed manually, in the absence of a speed control system 12 according to an embodiment of the present invention, the vehicle would likely experience severe rollback when the obstacle was encountered. The system 12 may maintain vehicle speed at or below the prescribed maximum trailing wheel step event speed value at least until one or both trailing wheels have reached the location at which the leading wheel step event was experienced. The system 12 may then remove the ceiling on allowable vehicle speed imposed following the leading wheel step event, allowing the LSP control system 12 to determine an appropriate speed for negotiating the obstacle. Other arrangements are also useful. For example, the LSP control system 12 may maintain the ceiling on allowable vehicle speed until one or both of the trailing wheels have negotiated the obstacle.

It is to be understood that the system 12 may be operable to detect leading wheel step events in respect of left and right wheels of the vehicle independently of one another. The system 12 may then coordinate vehicle speed such that respective left and right trailing wheels of the vehicle 100 encounter the obstacle(s) already encountered by the respective leading wheels at a speed at or below the prescribed maximum trailing wheel step event speed value. Other arrangements are also useful.

Figure 6:
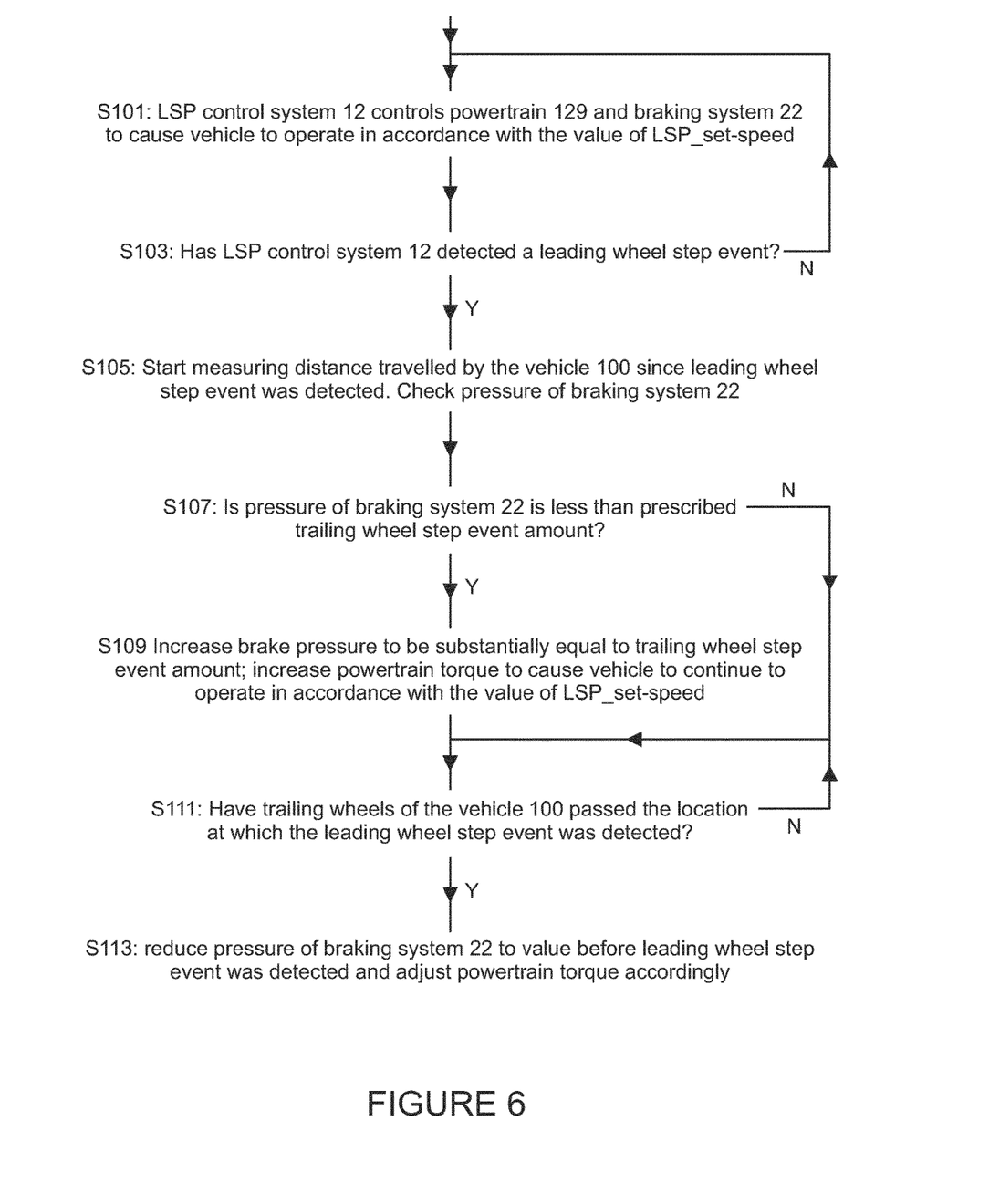
FIG. 6 is a flowchart illustrating operation of a vehicle according to an embodiment of the present invention.

FIG. 6 illustrates a method of controlling the vehicle 100 of FIG. 1 according to the present embodiment.

At step S101 the vehicle 100 is travelling over terrain with LSP control system 12 managing vehicle speed in accordance with the value of LSP_set-speed by controlling the powertrain 129 and braking system 22. That is, the control system 12 attempts to cause the vehicle to travel at a speed substantially equal to LSP_set-speed subject to any requirement to reduce speed, for example when it is determined that the prevailing value of LSP_set-speed is inappropriate for the prevailing terrain.

At step S103 the LSP control system 12 checks whether a leading wheel step event is detected. The system 12 does this by monitoring vehicle acceleration; if vehicle acceleration is negative (indicating deceleration of the vehicle 100) and the deceleration is not attributable to braking of the vehicle 100 by the braking system 22 or powertrain 129, the method continues at step S105 else the method continues at step S101.

At step S105 the LSP control system 12 starts measuring the distance travelled by the vehicle 100 since the leading wheel step event was detected.

The LSP control system 12 also checks the pressure of brake fluid in the braking system 22 by reference to a brake fluid pressure signal before continuing at step S107.

At step S107 the system 12 determines whether the pressure of brake fluid is less than a prescribed trailing wheel step event amount. If the pressure is less than the prescribed trailing wheel step event amount the method continues at step S109, else the method continues at step S111.

At step S109, when the distance travelled by the vehicle 100 since the leading wheel step event was detected has reached half the wheelbase value of the vehicle 100, the system 12 commands an increase in brake pressure by the braking system 22 to a value substantially equal to the prescribed trailing wheel step event amount.

A corresponding increase in powertrain torque is also commanded at this time, in order to cause the vehicle 100 to continue to operate in accordance with the value of LSP_set-speed. In this way, the system 12 effectively maintains vehicle composure whilst negotiating step-like obstacles by balancing the positive and negative torque applied to the wheels by the powertrain 129 and braking system 22. This effectively mitigates, at least in part, the effect the obstacle may otherwise have on vehicle progress, composure and occupant comfort.

At step S111 the system 12 checks whether the trailing wheels of the vehicle 100 have passed the location at which the leading wheel step event was detected. If the trailing wheels have passed this location the method continues at step S113. If the trailing wheels have not passed this location, step S111 is repeated. It is to be understood that the system 12 may be configured to terminate the method if the trailing wheels do not pass the location at which the leading wheel step event was detected within a prescribed period of the detection of the leading wheel step event. The period may be referred to as a 'time out' period.

At step S113 the LSP control system 12 commands a reduction in brake pressure of the braking system 22 to the prevailing value before the leading wheel step event was detected and adjusts powertrain torque accordingly. The method then continues at step S101. In some embodiments the LSP control system 12 may command a reduction in brake pressure substantially to zero, and a corresponding reduction in powertrain torque before continuing at step S101. It is to be understood, however, that the control system 12 continues to cause the vehicle 100 to operate in accordance with the value of LSP_set-speed or a lower limit of vehicle speed if one has been imposed.

Embodiments of the present invention enable a substantial improvement in vehicle composure when negotiating obstacles at least a portion of which presents a relatively abrupt increase in gradient of a driving surface. Embodiments of the invention reduce or eliminate bounce-back or longitudinal rebound of a vehicle when one or more trailing wheels encounter an object previously encountered by a leading wheel. This is accomplished in some embodiments by detecting the presence of an obstacle and applying brake force against driving force ahead of the encounter.

In another embodiment, not shown, the system 12 is further provided with input means arranged to permit the user to configure the operation of the system 12 and a memory to store these user defined preferences. In this way, the user may input an indication of an amount of intervention, whether more intervention or less intervention, to suit their driving style. In some embodiments the system 12 may permit a user to activate or deactivate the system 12 manually, via the input means. Where the system 12 is arranged to store user preferences, it may be further configured to store data relating to one or more trailers that the user wishes to tow with the vehicle. By inputting into the system 12 details specific to the type of trailer, such as drawbar length, number of axles, axle width and total vehicle and trailer unit length, the system 12 may compensate not only for the trailing wheel of the vehicle but also the wheels of the towed trailer. This approach greatly improves occupant comfort when towing a trailer over rough or varied terrain and reduces wear on both the vehicle and the trailer. The input means may be in the form of one or more physical control dials, switches or knobs, a touchscreen panel, or any other suitable input means.

Figure 7:
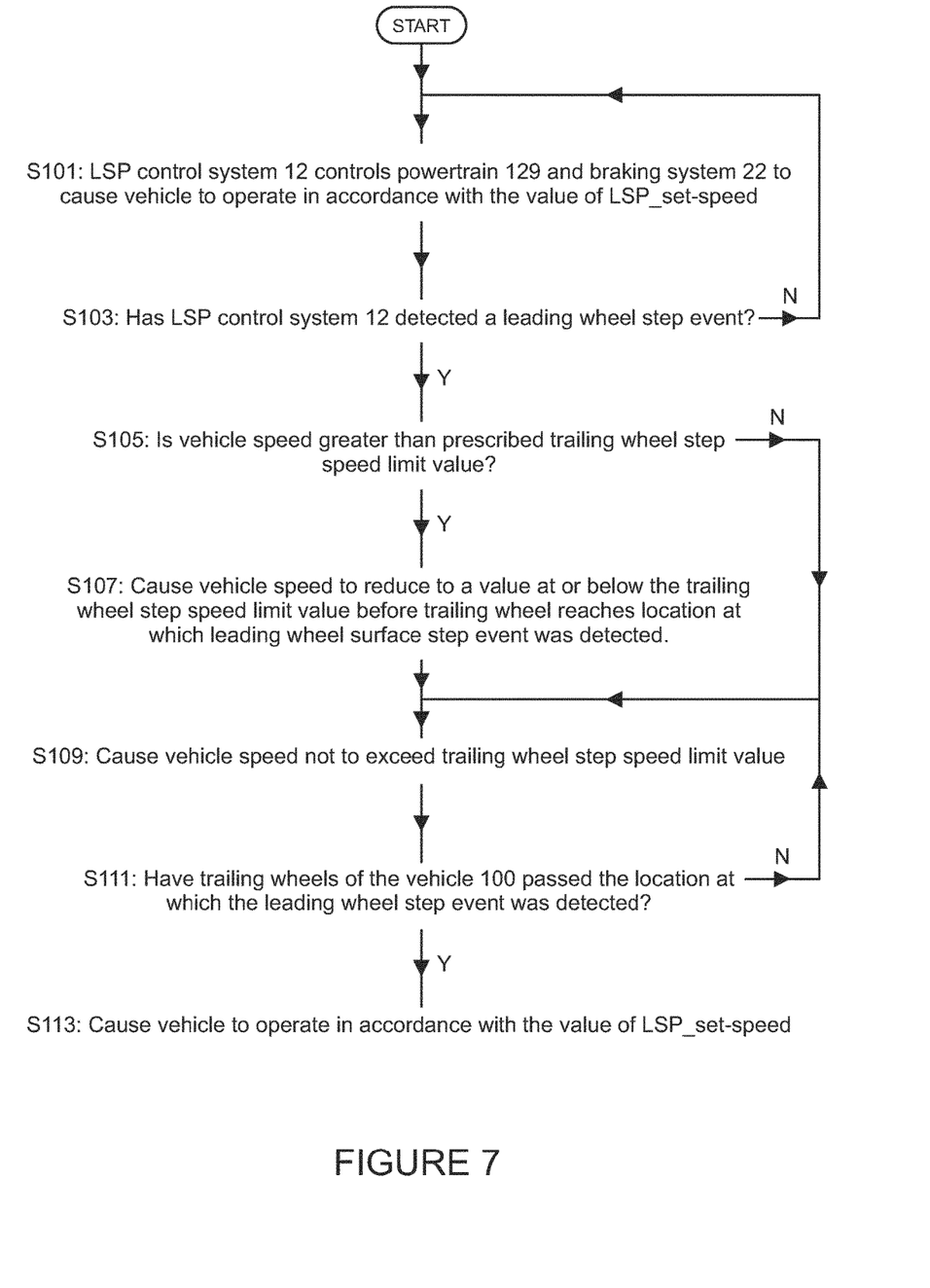
FIG. 7 is a flowchart illustrating operation of a vehicle according to an embodiment of the present invention.

FIG. 7 illustrates a method according to an embodiment of the present invention.

At step S101 the vehicle 100 is travelling over terrain with LSP control system 12 managing vehicle speed in accordance with the value of LSP_set-speed by controlling the powertrain 129 and braking system 22. That is, the control system 12 attempts to cause the vehicle to travel at a speed substantially equal to LSP_set-speed subject to any requirement to reduce speed, for example when it is determined that the prevailing value of LSP_set-speed is inappropriate for the prevailing terrain.

At step S103 the LSP control system 12 checks whether a leading wheel step event is detected. The system 12 does this be monitoring vehicle acceleration; if vehicle acceleration is negative (indicating deceleration of the vehicle 100) and the deceleration is not attributable to braking of the vehicle 100 by the braking system 22 or powertrain 129, the method continues at step S105 else the method continues at step S101. As noted above in respect of the method of FIG. 6, one or more other parameters may be monitored such as pitch rate and suspension articulation in order to distinguish between step events at leading and trailing wheels.

At step S105 the LSP control system 12 determines whether the instant vehicle speed is greater than a prescribed trailing wheel step speed limit value. If the instant speed is greater than this value the method continues at step S107. If the instant speed is not greater than this value the method continues at step S109. The value of trailing wheel step speed limit may be set in dependence on one or more parameters such as terrain type, terrain roughness, and/or a severity of the leading wheel step event. The value of trailing wheel step speed limit may be set so as to achieve a desired balance between a desire for the vehicle to travel at a sufficiently high speed to make satisfactory progress over terrain, and a requirement to maintain vehicle composure when the trailing wheel experiences the trailing wheel step event. The value may be as low as 1 or 2 kph in some embodiments. In some embodiments the value of trailing wheel step speed limit is selected in the range from 3 to 10 kph depending on the severity of the leading wheel step event. Severity of the leading wheel step event may be determined in dependence on the maximum rate of deceleration experienced by the vehicle 100 when the leading wheel step event is detected.

At step S107 the LSP control system 12 causes the vehicle speed to reduce to a value at or below the trailing wheel step speed limit value. The system 12 is configured to ensure that the speed of the vehicle 100 is reduced to such a value before the trailing wheel reaches a location at which the leading wheel step event was detected. The system 12 then causes the vehicle 100 to travel at a target speed that is temporarily set substantially equal to the trailing wheel step speed limit value unless the user reduces the target speed below this value, i.e. the user sets the value of LSP_set-speed to a value below the trailing wheel step speed limit value.

As step S109 the LSP control system 12 causes the vehicle 100 to travel at a speed that does not exceed the trailing wheel step speed limit value. If the value of LSP_set-speed is lower than the trailing wheel step speed limit value the system 12 causes the vehicle to operate in accordance with a target speed that is equal the value of LSP_set-speed; if the value of LSP_set-speed is subsequently set to a value higher than the trailing wheel step speed limit value before the trailing wheel has reached the location at which the leading wheel step event was detected, the LSP control system 12 causes a speed of the vehicle 100 to be limited to the trailing wheel step speed limit value until the trailing wheels have passed the location at which the leading wheel step event was detected.

At step S11 the LSP control system 12 checks whether trailing wheels of the vehicle 100 have passed the location at which the leading wheel step event was detected. If the vehicle 100 has passed this location the system 12 continues at step S113. It the vehicle 100 has not passed this location the system 12 continues at step S109.

At step S113 the LSP control system 12 resumes causing the vehicle 100 to operate in accordance with the value of LSP_set-speed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle speed control system, comprising:
an electronic controller operable to cause a vehicle to operate in accordance with a target speed value by controlling an amount of brake torque applied by a braking system and an amount of drive torque applied by a powertrain to one or more wheels of the vehicle, the controller being operable to detect a leading wheel step event in which a leading wheel encounters and clears an obstacle presenting an abrupt increase in surface gradient,
the controller being operable in dependence on the detection of said leading wheel step event to cause brake torque to be applied against drive torque in anticipation of a corresponding trailing wheel step event, the controller being operable to cause said brake torque to be applied after the leading wheel clears the obstacle, and before a trailing wheel has travelled a sufficient distance to reach a location at which said leading wheel experienced the leading wheel step event, the controller being operable to maintain said brake torque at least until the trailing wheel has travelled the sufficient distance to reach the location at which the leading wheel experienced said leading wheel step event.

2. A system according to claim 1 operable to increase the amount of drive torque applied to the one or more wheels to compensate at least in part for the increase in brake torque applied in response to detection of the leading wheel step event.

3. A system according to claim 1 operable to detect a trailing wheel step event.

4. A system according to claim 3 operable to decrease the amount of brake torque applied against drive torque once a trailing wheel step event has been detected.

5. A system according to claim 1 operable to limit a speed of the vehicle to a prescribed step speed limit value after a leading wheel step is detected and before a trailing wheel reaches the location at which the leading wheel step event was detected, the system being operable to lift the limit on speed when the trailing wheel has passed the location at which the leading wheel step event was detected.

6. A system according to claim 5 wherein the step speed limit value is determined at least in part in dependence on one or more characteristics of terrain over which the vehicle is travelling.

7. A system according to claim 6 wherein the one or more characteristics are determined at least in part by reference to a currently selected driving mode of the vehicle.

8. A system according to claim 7 wherein the control system comprises a plurality of subsystem controllers each operable in a plurality of subsystem function modes, the system being operable to cause the vehicle to operate in one of a plurality of driving modes, wherein in each mode each of the sub-systems is set to the function mode most appropriate to those conditions.

9. A system according to claim 1 operable to detect the leading wheel step event at least in part in dependence on detection of an abrupt increase in rate of deceleration of the vehicle consistent with a leading wheel step event.

10. A system according to claim 9 operable to detect the leading wheel step event at least in part in dependence on detection that a rate of deceleration of the vehicle consistent with a leading wheel step event exceeds a prescribed value over a prescribed period.

11. A system according to claim 1 operable to detect the leading wheel step event at least in part in dependence on detection of an abrupt increase in rate of deceleration of the vehicle consistent with a leading wheel step event.

12. A vehicle comprising a system according to claim 1.

13. A vehicle according to claim 12 having four wheels, the vehicle being operable in a four wheel drive mode in which each of the four wheels are driven by a powertrain of the vehicle.

14. A vehicle according to claim 13 further operable in a two wheel drive mode in which only two wheels of the vehicle are driven by the powertrain.

15. A method of controlling a vehicle comprising:
causing the vehicle to operate in accordance with a target speed value by controlling an amount of brake torque applied by a braking system and an amount of drive torque applied by a powertrain to one or more wheels of the vehicle;
detecting a leading wheel step event in which a leading wheel encounters and clears an obstacle presenting an abrupt increase in surface gradient; and
causing brake torque to be applied against drive torque in dependence on detection of said leading wheel step event in anticipation of a corresponding trailing wheel step event, including:
causing said brake torque to be applied after the leading wheel clears the obstacle, and before a trailing wheel has travelled a sufficient distance to reach a location at which said leading wheel experienced the leading wheel step event; and
maintaining said brake torque at least until a trailing wheel has travelled the sufficient distance to reach the location at which said leading wheel experienced the leading wheel step event.

16. A vehicle speed control system, comprising:
an electronic controller operable to cause a vehicle to operate in accordance with a target speed value by controlling an amount of brake torque applied by a braking system and an amount of drive torque applied by a powertrain to one or more wheels of the vehicle, the controller being operable to detect a leading wheel step event in which a leading wheel encounters and clears an obstacle presenting an abrupt increase in surface gradient, the controller being operable in dependence on the detection of said leading wheel step event to limit a speed of the vehicle to a prescribed step speed limit value after said leading wheel step event is detected and after the leading wheel clears the obstacle, and before a trailing wheel reaches a location at which the leading wheel step event was detected, the controller being operable to lift the limit on speed when the trailing wheel has passed the location at which the leading wheel step event was detected.

17. A system according to claim 16 wherein the step speed limit value is determined at least in part in dependence on one or more characteristics of terrain over which the vehicle is travelling.

18. A system according to claim 17 wherein the one or more characteristics are determined at least in part by reference to a currently selected driving mode of the vehicle.

19. A method of controlling a vehicle comprising:
causing the vehicle to operate in accordance with a target speed value by controlling an amount of brake torque applied by a braking system and an amount of drive torque applied by a powertrain to one or more wheels of the vehicle;
detecting a leading wheel step event in which a leading wheel encounters and clears an obstacle presenting an abrupt increase in surface gradient; and
causing brake torque to be applied against drive torque in dependence on detection of said leading wheel step event in anticipation of a corresponding trailing wheel step event in which a trailing wheel encounters a corresponding obstacle, including:
causing said brake torque to be applied after the leading wheel clears the obstacle, and before said trailing wheel has travelled a sufficient distance to reach a location at which said leading wheel experienced the leading wheel step event; and
maintaining said brake torque at least until said trailing wheel has travelled the sufficient distance to reach the location at which the leading wheel experienced the leading wheel step event.

20. A non-transitory, computer-readable storage medium storing instructions thereon that when executed by one or more electronic processors causes the one or more electronic processors to carry out the method of claim 15.

21. An electronic controller for a vehicle having a storage medium associated therewith storing instructions that when executed by the controller control the vehicle in accordance with the method of:
causing the vehicle to operate in accordance with a target speed value by controlling an amount of brake torque applied by a braking system and an amount of drive torque applied by a powertrain to one or more wheels of the vehicle;
detecting a leading wheel step event in which a leading wheel encounters and clears an obstacle presenting an abrupt increase in surface gradient; and
causing brake torque to be applied against drive torque in dependence on detection of said leading wheel step event in anticipation of a corresponding trailing wheel step event in which a trailing wheel encounters a corresponding obstacle, including:
causing said brake torque to be applied after the leading wheel clears the obstacle, and before said trailing wheel has travelled a sufficient distance to reach a location at which said leading wheel experienced the leading wheel step event; and
maintaining said brake torque at least until said trailing wheel has travelled the sufficient distance to reach the location at which the leading wheel experienced the leading wheel step event.

* * * * *